US012717347B2

(12) United States Patent
Jonsson et al.

(10) Patent No.: US 12,717,347 B2
(45) Date of Patent: Aug. 25, 2026

(54) COOPERATION OF ROBOTIC WORKING TOOLS IN A ROBOTIC WORKING TOOL SYSTEM

(71) Applicant: HUSQVARNA AB, Huskvarna (SE)

(72) Inventors: Herman Jonsson, Huskvarna (SE); Adam Tengblad, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 88 days.

(21) Appl. No.: 18/683,028

(22) PCT Filed: May 25, 2022

(86) PCT No.: PCT/SE2022/050508
§ 371 (c)(1),
(2) Date: Feb. 12, 2024

(87) PCT Pub. No.: WO2023/018363
PCT Pub. Date: Feb. 16, 2023

(65) Prior Publication Data

US 2024/0345599 A1 Oct. 17, 2024

(30) Foreign Application Priority Data

Aug. 12, 2021 (SE) .................................... 2150996-3

(51) Int. Cl.
*G05D 1/646* (2024.01)
*A01D 34/00* (2006.01)

(52) U.S. Cl.
CPC ........... *G05D 1/646* (2024.01); *A01D 34/008* (2013.01)

(58) Field of Classification Search
CPC .............................. G05D 1/646; A01D 34/008
See application file for complete search history.

(56) References Cited

U.S. PATENT DOCUMENTS

2012/0158177 A1 6/2012 Lee et al.
2016/0271796 A1* 9/2016 Babu ...................... B25J 9/1664

(Continued)

FOREIGN PATENT DOCUMENTS

DE 102015215101 A1 2/2017
EP 3324261 A1 5/2018
WO 2020081646 A2 4/2020

OTHER PUBLICATIONS

International Search Report and Written Opinion for PCT application No. PCT/SE2022/050508 mailed on Sep. 13, 2022.

(Continued)

*Primary Examiner* — Andrew J Cromer
(74) *Attorney, Agent, or Firm* — Burr & Forman

(57) ABSTRACT

A method for use in a robotic working tool system (400) comprising a first robotic working tool (200A) and at least one second robotic working tool (200B), the second robotic working tool (200B) comprising a communication interface (203) and a controller (201), wherein the communication interface (203) is configured to connect the second robotic working tool to the first robotic working tool (200B), the first robotic working tool (200A) comprising a communication interface (203), wherein the communication interface (203) is configured to connect the first robotic working tool to a server and to the at least one second robotic working tool (200B), and wherein the method comprises the first robotic working tool (200A); receiving information regarding a work mission, the information comprising parameters for the work mission; receiving operational parameters for the at least one second robotic working tool (200B); determining path planning for each of the for the at least one second robotic working tool (200B) based on the operational parameters for the at least one second robotic working tool (200B) and the information regarding the work mission so that the path planning completes the work mission, and transmitting (Continued)

the path planning for the at least one second robotic working tool (200) to the at least one second robotic working tool (200B), and wherein method further comprises the second robotic working tool (200B); receiving path planning data from the first robotic working tool (200A) and executing the work mission according to the path planning data.

18 Claims, 9 Drawing Sheets

(56) References Cited

U.S. PATENT DOCUMENTS

| | | | | |
|---|---|---|---|---|
| 2017/0313303 | A1* | 11/2017 | Valtanen | G05D 1/0295 |
| 2020/0023511 | A1 | 1/2020 | Lee | |
| 2020/0081453 | A1 | 3/2020 | Kwak et al. | |
| 2020/0230806 | A1 | 7/2020 | Choi | |
| 2020/0326713 | A1 | 10/2020 | Spielman et al. | |
| 2021/0232149 | A1* | 7/2021 | Griffin | G06V 20/10 |
| 2024/0168497 | A1* | 5/2024 | Li | G05D 1/0225 |

OTHER PUBLICATIONS

Office Action and Search Report for Swedish Application No. 2150996-3 mailed on Apr. 12, 2022.

* cited by examiner

COOPERATION OF ROBOTIC WORKING TOOLS IN A ROBOTIC WORKING TOOL SYSTEM

TECHNICAL FIELD

This application relates to robotic working tools and in particular to a system and a method for providing an improved cooperation in a robotic working tool system.

BACKGROUND

Automated or robotic power tools such as robotic lawnmowers are becoming increasingly more popular. The robotic working tools are being deployed in more and more varied work areas, such as a gardens, sports fields or even airfields. Such work areas have in common that they are relatively large and/or needs servicing of different types. As a consequence, the work area may not be properly serviced by a single robotic working tool.

FIG. 1A shows a schematic view of an example of a typical work area 105, being a garden, in which a robotic working tool 10A, such as a robotic lawnmower, is set to operate.

The garden contains a number of obstacles, exemplified herein by a number (2) of trees (T), a stone(S) and a house structure (H). The trees are marked both with respect to their trunks (filled lines) and the extension of their foliage (dashed lines). The garden of this example is enclosed by a boundary wire 120 through which a control signal 125 is transmitted by a signal generator 115 housed in a charging station 110, the control signal 125 generating a magnetic field that can be sensed by the robotic working tool 10. In this example the boundary wire 120 is laid so that so-called islands are formed around the trees and the house. The garden also comprises or is in the line of sight of at least one signal navigation device 130. In this example the signal navigation device 130 is exemplified as a beacon, but it should be noted that it may also be any number of satellites. The use of satellite and/or beacon navigation enables for a boundary that is virtual, in addition to or as an alternative to the boundary wire 120. A virtual boundary 120' is indicated in FIG. 1 by the dotted line. From hereon there will be made no difference between the boundary being defined by the boundary wire 120 or as a virtual boundary 120' and the boundary of the work area 105 will hereafter simply be referred to as the boundary 120, unless otherwise specifically mentioned. In the example of FIG. 1, the robotic working tool is set to operate according to a specific pattern PA indicated by the dashed arrow in FIG. 1A. As stated above, the work area, in this case, the garden, may be too big or require different servicing, whereby the garden needs to be serviced by a second robotic working tool 10B as well as the first robotic working tool 10A. FIG. 1A also shows such a second robotic working tool 10B arranged to operate in a second work pattern 10B. As is indicated there are some problems that occur when more than one robotic working tool 10 is set to operate in the same work area, for example, the robotic working tools 10 may be set to work in work patterns that incur a risk of collision, that incur double servicing of a same area, thereby wasting time and resources, or they may even become stuck or otherwise incapacitated by one another.

Previous attempts at finding solutions for reducing risks include dividing the work area into two separate work areas, each serviced by one robotic working tool. FIG. 1B shows an example of such a solution where the work area 105 is divided into two partial work areas 105A, 105B, possibly using a further boundary wire 120B, and arranging each robotic working tool 10A, 10B to service one of the partial work areas 105A, 105B. This, however, does not solve the problems when two robotic working tools of different types are set to service or operate in the same area, and this may also lead to wasting time and resources in that if one robotic working tool 10 is finished early in its partial work area, it is simply to wait instead of helping in the other work area.

Other attempts at finding solutions include enabling a server to control the robotic working tools and to direct them to service the work areas. Such solutions however, require good and stable connections between the robotic working tools and the server, that the server is aware of all local environmental factors that may affect the servicing of the work area, and that all robotic working tools are complex in order to be able to provide all such information and to remain in contact with the server all through the servicing, thereby increasing the cost of the system.

Thus, there is a need for an improved manner of enabling cooperation in a robotic working tool that is cheaper and that does not require stable and reliable connections to a server.

SUMMARY

It is therefore an object of the teachings of this application to overcome or at least reduce those problems by providing a robotic working tool system comprising a first robotic working tool and at least one second robotic working tool, the second robotic working tool comprising a communication interface and a controller, wherein the communication interface is configured to connect the second robotic working tool to the first robotic working tool, the first robotic working tool comprising a communication interface and a controller, wherein the communication interface is configured to connect the first robotic working tool to a server and to the at least one second robotic working tool, and wherein the controller of the first robotic working tool is configured to: receive information regarding a work mission, the information comprising parameters for the work mission; receive operational parameters for the at least one second robotic working tool; determine path planning for each of the for the at least one second robotic working tool based on the operational parameters for the at least one second robotic working tool and the information regarding the work mission so that the path planning completes the work mission, and to transmit the path planning for the at least one second robotic working tool to the at least one second robotic working tool, and wherein the controller of the second robotic working tool is configured to: receive path planning data from the first robotic working tool and to execute the work mission according to the path planning data.

In some embodiments the at least one second robotic working tool comprises a second number of sensors and wherein the controller of the second robotic working tool is further configured to receive sensor input from the second number of sensors and transmit the sensor input to the first robotic working tool, and wherein the controller of the first robotic working tool is further configured to receive the sensor input from the at least one second robotic working tool and determine the path planning for each of the for the at least one second robotic working tool further based on the sensor input.

In some embodiments the first robotic working tool comprises a first number of sensors and wherein the controller of the first robotic working tool is further configured to receive sensor input from the first number of sensors and determine the path planning for each of the for the at least one second robotic working tool further based on the sensor input.

In some embodiments the first number of sensors is greater than the second number of sensors.

In some embodiments the first number of sensors includes an imaging device, providing one or more images of at least part of the work area, and wherein the controller of the first robotic working tool is further configured to determine a surveillance of the work area based on the one or more images and to determine the path planning for each of the for the at least one second robotic working tool further based on the surveillance of the work area.

In some embodiments the first number of sensors includes a remote sensor, and wherein the controller of the first robotic working tool is further configured to connect to the remote sensor to receive sensor input.

In some embodiments the imaging device is comprised in the remote sensor.

In some embodiments the robotic working tool system further comprising a drone and wherein the remote sensor is arranged in the drone.

In some embodiments at least one of the first number of sensors is receiving sensor input at a higher quality than a corresponding sensor in the second number of sensors.

In some embodiments a first of the at least one second robotic working tool comprises a first work tool and a second of the at least one second robotic working tool comprises a second work tool, wherein the first and the second work tools are of different types.

In some embodiments the first robotic working tool is arranged without a work tool.

In some embodiments the controller of the first robotic working tool is further configured to determine path planning also for the first robotic working tool and execute the work mission by causing the first robotic working tool to follow the planned path, and wherein the controller of the second robotic working tool is further configured to execute the work mission by causing the second robotic working tool to follow the first robotic working tool in a pattern, where the path planning for each second robotic working tool indicates the pattern.

In some embodiments the controller of the first robotic working tool is further configured to connect to the at least one second robotic working tool via the server, and wherein the controller of the second robotic working tool is further configured to connect to the server and to connect to the first robotic working tool via the server.

In some embodiments the controller of the first robotic working tool is further configured to determine that the connection to the server is of a quality falling below a threshold level and in response thereto cause the first robotic working tool to move to a position indicative of a good connection to the server.

In some embodiments the first robotic working tool comprises a satellite navigation device configured to receive satellite signals for determining a position, and wherein the controller of the first robotic working tool is further configured to determine that the reception of satellite signals is of a quality falling below a threshold level and in response thereto cause the first robotic working tool to move to a position indicative of a good reception of satellite signals.

In some embodiments the controller of the first robotic working tool is further configured to determine the position and transmit the determined position to at least one of the at least one second robotic working tool, thereby acting as a navigational beacon for the at least one of the at least one second robotic working tool.

In some embodiments the controller of the first robotic working tool 200A is further configured to receive updated information, and in response thereto determine updated path planning and transmit the updated path planning to at least one of the at least one the second robotic working tools.

In some embodiments the robotic working tool is configured for operating in a work area comprising an uneven surface, where objects are of a similar appearance to the surface and/or overhanging obstacles.

In some embodiments at least one of the at least one second robotic working tool is a robotic lawnmower.

It is also an object of the teachings of this application to overcome the problems by providing a method for use in a robotic working tool system comprising a first robotic working tool and at least one second robotic working tool, the second robotic working tool comprising a communication interface and a controller, wherein the communication interface is configured to connect the second robotic working tool to the first robotic working tool, the first robotic working tool comprising a communication interface, wherein the communication interface is configured to connect the first robotic working tool to a server and to the at least one second robotic working tool, and wherein the method comprises the first robotic working tool: receiving information regarding a work mission, the information comprising parameters for the work mission; receiving operational parameters for the at least one second robotic working tool; determining path planning for each of the for the at least one second robotic working tool based on the operational parameters for the at least one second robotic working tool and the information regarding the work mission so that the path planning completes the work mission, and transmitting the path planning for the at least one second robotic working tool to the at least one second robotic working tool, and wherein method further comprises the second robotic working tool: receiving path planning data from the first robotic working tool and executing the work mission according to the path planning data.

It is also an object of the teachings of this application to overcome the problems by providing a robotic working tool comprising a communication interface and a controller, wherein the communication interface is configured to connect the robotic working tool to a server and to at least one second robotic working tool, and wherein the controller is configured to: receive information regarding a work mission, the information comprising parameters for the work mission; receive operational parameters for the at least one second robotic working tool; determine path planning for each of the for the at least one second robotic working tool based on the operational parameters for the at least one second robotic working tool and the information regarding the work mission so that the path planning completes the work mission; and to transmit the path planning for the at least one second robotic working tool to the at least one second robotic working tool.

It is also an object of the teachings of this application to overcome the problems by providing a method for use in a robotic working tool comprising a communication interface, wherein the communication interface is configured to connect the robotic working tool to a server and to at least one second robotic working tool, and wherein the method comprises: receiving information regarding a work mission, the information comprising parameters for the work mission; receiving operational parameters for the at least one second robotic working tool; determining path planning for each of the for the at least one second robotic working tool based on the operational parameters for the at least one second robotic working tool and the information regarding the work mission so that the path planning completes the work mission; and transmitting the path planning for the at least one second robotic working tool to the at least one second robotic working tool.

It is also an object of the teachings of this application to overcome the problems by providing a robotic working tool comprising a communication interface and a controller, wherein the communication interface is configured to connect the robotic working tool to first robotic working tool, and wherein the controller is configured to: receive path planning data regarding a work mission from the first robotic working tool and to execute the work mission according to the path planning data.

It is also an object of the teachings of this application to overcome the problems by providing a method for use in a robotic working tool comprising a communication interface, wherein the communication interface is configured to connect the robotic working tool to first robotic working tool, and wherein the method comprises: receiving path planning data regarding a work mission from the first robotic working tool and executing the work mission according to the path planning data.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to, robotic ball collectors, robotic mine sweepers, robotic farming equipment, or other robotic working tools where a work tool is to be safeguarded against from accidentally extending beyond or too close to the edge of the robotic working tool.

Figure 2A:
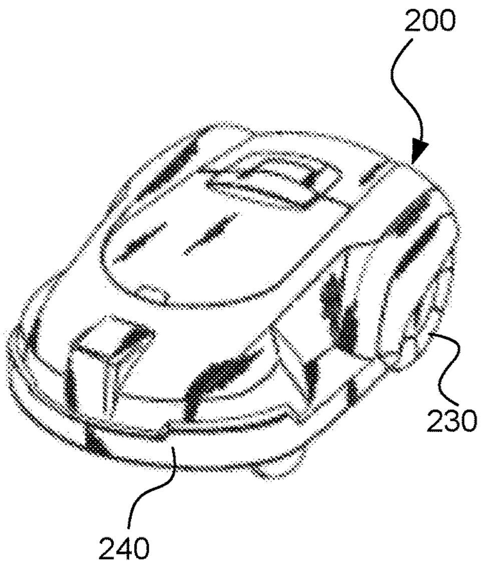
FIG. 2A shows an example of a robotic working tool according to some embodiments of the teachings herein.

FIG. 2A shows a perspective view of a robotic working tool 200, here exemplified by a robotic lawnmower 200, having a body 240 and a plurality of wheels 230 (only one side is shown). The robotic working tool 200 may be a multi-chassis type or a mono-chassis type (as in FIG. 2A). A multi-chassis type comprises more than one main body parts that are movable with respect to one another. A mono-chassis type comprises only one main body part.

It should be noted that even though the description herein is focused on the example of a robotic lawnmower, the teachings may equally be applied to other types of robotic working tools, such as robotic floor grinders, robotic floor cleaners to mention a few examples where a work tool should be kept away from the edges for safety or convenience concerns.

It should also be noted that the robotic working tool is a self-propelled robotic working tool, capable of autonomous navigation within a work area, where the robotic working tool propels itself across or around the work area in a pattern (random or predetermined).

Figure 2B:
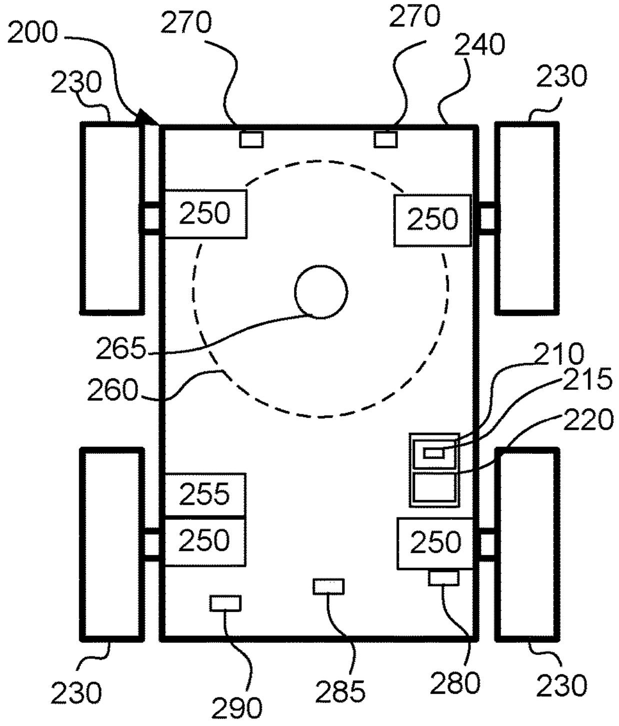
FIG. 2B shows a schematic view of the components of an example of a robotic working tool being a robotic lawnmower according to some example embodiments of the teachings herein.

FIG. 2B shows a schematic overview of the robotic working tool 200, also exemplified here by a robotic lawnmower 200. In this example embodiment the robotic lawnmower 200 is of a mono-chassis type, having a main body part 240. The main body part 240 substantially houses all components of the robotic lawnmower 200. The robotic lawnmower 200 has a plurality of wheels 230. In the exemplary embodiment of FIG. 2B the robotic lawnmower 200 has four wheels 230, two front wheels and two rear wheels. At least some of the wheels 230 are drivably connected to at least one electric motor 250. It should be noted that even if the description herein is focused on electric motors, combustion engines may alternatively be used, possibly in combination with an electric motor. In the example of FIG. 2B, each of the wheels 230 is connected to a common or to a respective electric motor 255 for driving the wheels 230 to navigate the robotic lawnmower 200 in different manners. The wheels, the motor 255 and possibly the battery 250 are thus examples of components making up a propulsion device. By controlling the motors 250, the propulsion device may be controlled to propel the robotic lawnmower 200 in a desired manner, and the propulsion device will therefore be seen as synonymous with the motor(s) 250.

The robotic lawnmower 200 also comprises a controller 210 and a computer readable storage medium or memory 220. The controller 210 may be implemented using instructions that enable hardware functionality, for example, by using executable computer program instructions in a general-purpose or special-purpose processor that may be stored on the memory 220 to be executed by such a processor. The controller 210 is configured to read instructions from the memory 220 and execute these instructions to control the operation of the robotic lawnmower 200 including, but not being limited to, the propulsion and navigation of the robotic lawnmower.

The controller 210 in combination with the electric motor 255 and the wheels 230 forms the base of a navigation system (possibly comprising further components) for the robotic lawnmower, enabling it to be self-propelled as discussed under FIG. 2A, The controller 210 may be implemented using any suitable, available processor or Programmable Logic Circuit (PLC). The memory 220 may be implemented using any commonly known technology for computer-readable memories such as ROM, FLASH, DDR, or some other memory technology.

The robotic lawnmower 200 is further arranged with a wireless communication interface 215 for communicating with other devices, such as a server, a personal computer, a smartphone, the charging station, and/or other robotic working tools. Examples of such wireless communication devices are Bluetooth®, WiFi® (IEEE802.11b), Global System Mobile (GSM) and LTE (Long Term Evolution), to name a few. The robotic lawnmower 100 is specifically arranged to communicate with a computing device 300 as discussed in relation to FIG. 3 below for providing information regarding status, location, and progress of operation to the computing device 300 as well as receiving commands or settings from the computing device 300.

The robotic lawnmower 200 also comprises a grass cutting device 260, such as a rotating blade 260 driven by a cutter motor 265. The grass cutting device being an example of a work tool 260 for a robotic working tool 200. Other examples of work tools are edge cutters, grass trimmers, mulchers, sweepers, watering arrangements,

MORE EXAMPLES

The robotic lawnmower 200 may further comprises at least one navigation sensor 285, such as a beacon navigation sensor and/or a satellite navigation sensor. The beacon navigation sensor may be a Radio Frequency receiver, such as an Ultra Wide Band (UWB) receiver or sensor, configured to receive signals from a Radio Frequency beacon, such as a UWB beacon. The satellite navigation sensor may be a GPS (Global Positioning System) device or other Global Navigation Satellite System (GNSS) device. In embodiments, where the robotic lawnmower 200 is arranged with a navigation sensor, the magnetic sensors 270 as will be discussed below are optional. In embodiments relying (at least partially) on a navigation sensor, the work area may be specified as a virtual work area in a map application stored in the memory 220 of the robotic lawnmower 200. The virtual work area may thus be defined by a virtual boundary.

In the examples that will be discussed herein the navigation sensor 285 is a satellite navigation sensor, such as GPS, GNSS or a supplemental satellite navigation sensor such as RTK.

The robotic lawnmower 200 may also or alternatively comprise deduced reckoning sensors 280. The deduced reckoning sensors may be odometers, accelerometer or other deduced reckoning sensors. In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

The robotic working tool 200 may also comprise additional sensors 290 for enabling operation of the robotic working tool 200, such as visual sensors (for example a camera), or ranging sensors. Such sensors may be utilized to provide Simultaneous Localization and Mapping (SLAM) navigation of the work area. Other examples of sensors are moisture sensors, rain sensors, and so on. These are examples of external sensors.

One example of internal sensors is sensors for sensing the power drawn by the work tool to determine a load on the work tool. For embodiments such as where the robotic working tool is a robotic lawnmower, this can be used to determine the height or thickness of the grass being cut, which may in turn be used to determine the efficiency of the cutting. Other examples of internal sensors are sensors for detecting wheel spin (which may be comprised in the sensors for deduced reckoning 280), which in turn may be used to determine slipping, or sensors for detecting movement, such as Inertial Movement Units (IMU), which in turn may be used to determine slipping or travelling at an angle.

Figure 1A:
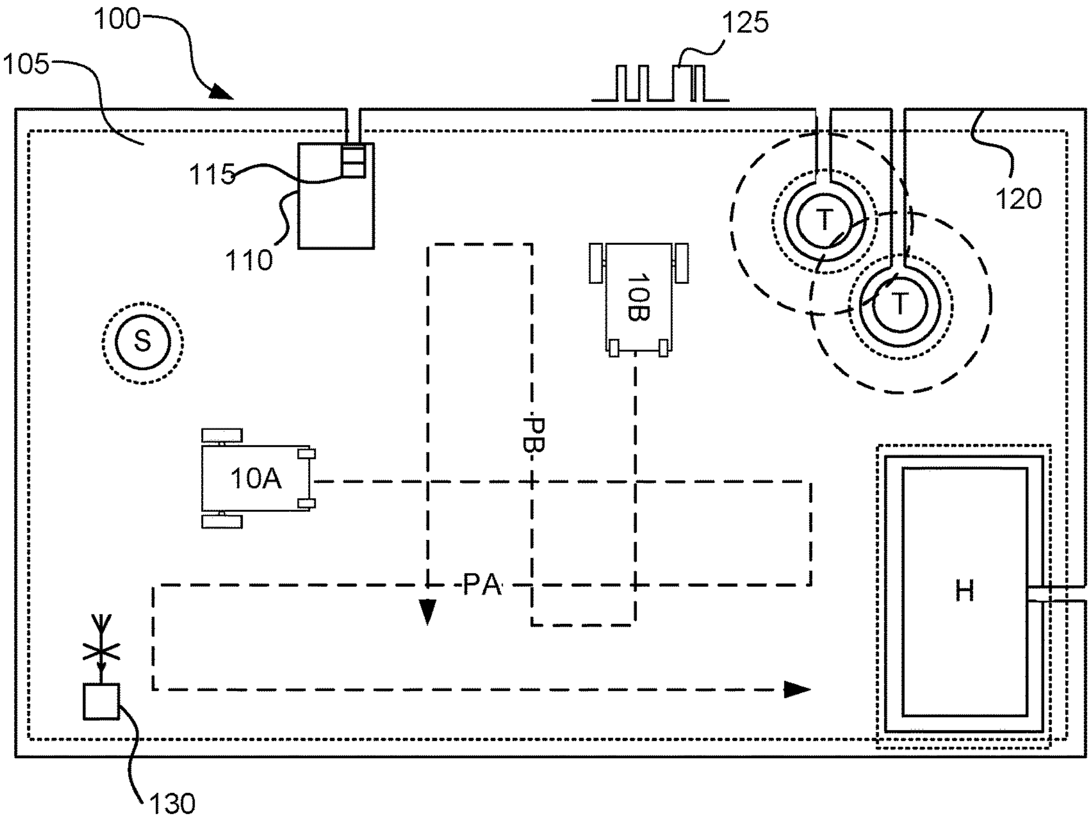
FIG. 1A shows an example of a robotic working tool system.
Figure 1B:
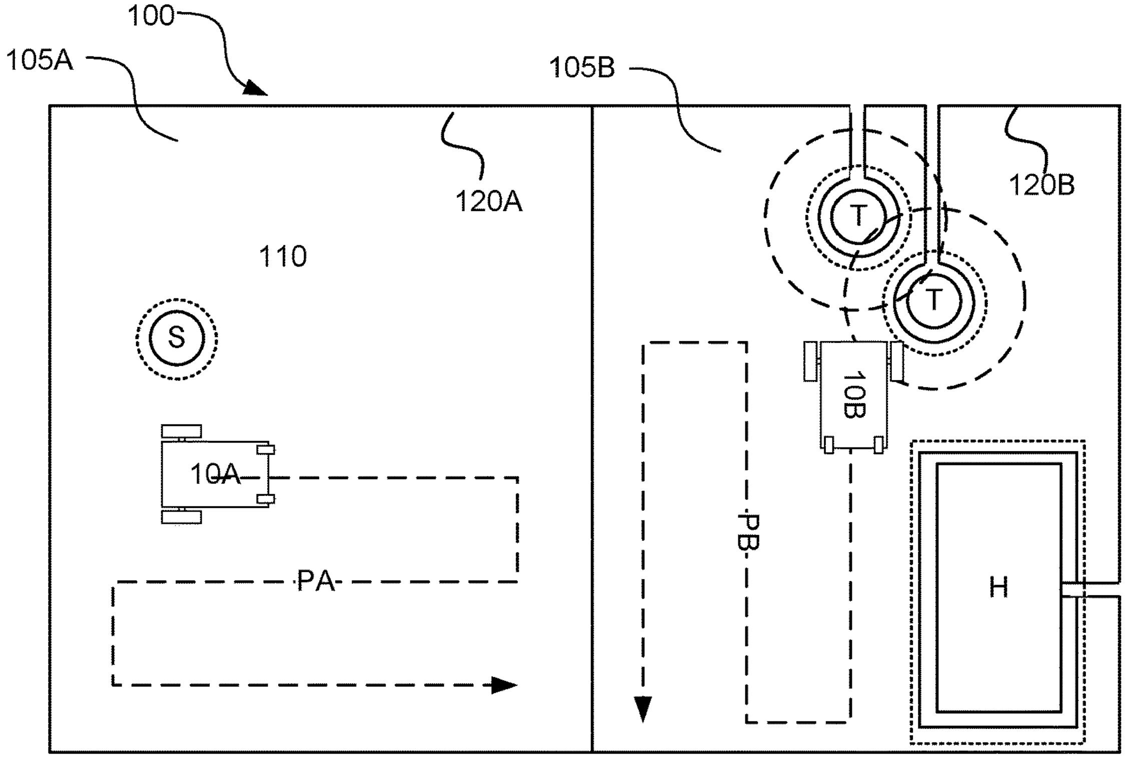
FIG. 1B shows an example of a robotic working tool system.

For enabling the robotic lawnmower 200 to navigate with reference to a boundary wire emitting a magnetic field caused by a control signal transmitted through the boundary wire, the robotic lawnmower 200 is, in some embodiments, further configured to have at least one magnetic field sensor 270 arranged to detect the magnetic field and for detecting the boundary wire and/or for receiving (and possibly also sending) information to/from a signal generator (will be discussed with reference to FIG. 1). In some embodiments, the sensors 270 may be connected to the controller 210, possibly via filters and an amplifier, and the controller 210 may be configured to process and evaluate any signals received from the sensors 270. The sensor signals are caused by the magnetic field being generated by the control signal being transmitted through the boundary wire. This enables the controller 210 to determine whether the robotic lawnmower 200 is close to or crossing the boundary wire, or inside or outside an area enclosed by the boundary wire.

As mentioned above, in some embodiments, the robotic lawnmower 200 is arranged to operate according to a map of the work area 205 (and possibly the surroundings of the work area 205) stored in the memory 220 of the robotic lawnmower 200. The map may be generated or supplemented as the robotic lawnmower 200 operates or otherwise moves around in the work area 205.

Figure 3:
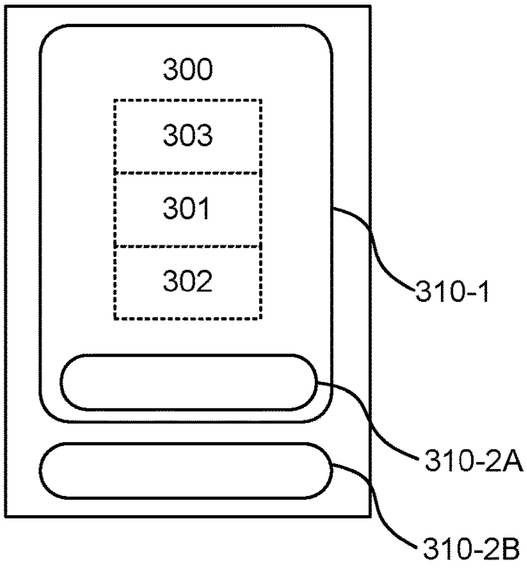
FIG. 3 shows an example of a computing device, such as a user equipment, according to some embodiments of the teachings herein.

FIG. 3 shows a schematic view of a computing device 300 according to an embodiment of the present invention.

In some example embodiments, the computing device 300 is a server or a cloud server, such as implementing the server 440 illustrated in FIG. 4.

In some example embodiments, the computing device 300 is a user equipment 300 such as a smartphone, smartwatch or a tablet computer. In some such example embodiments, the computing device 300 is arranged to connect to a server, such as the server 440 illustrated in FIG. 4, possibly a cloud server, the computing device acting as an interconnecting device.

The computing device 300 comprises a controller 301 a memory 302 and a user interface 310.

It should be noted that the computing device 300 may comprise a single device or may be distributed across several devices and apparatuses.

The controller 301 is configured to control the overall operation of the computing device 300 and specifically to execute a robotic working tool controlling application. In some embodiments, the controller 301 is a specific purpose controller. In some embodiments, the controller 301 is a general purpose controller. In some embodiments, the controller 301 is a combination of one or more of a specific purpose controller and/or a general purpose controller. As a skilled person would understand there are many alternatives for how to implement a controller, such as using Field-Programmable Gate Arrays circuits, ASIC, GPU, NPU etc. in addition or as an alternative. For the purpose of this application, all such possibilities and alternatives will be referred to simply as the controller 301.

The memory 302 is configured to store data such as application data, settings and computer-readable instructions that when loaded into the controller 301 indicates how the user equipment 300 is to be controlled. The memory 302 is also specifically for storing the robotic working tool controlling application and data associated therewith. The memory 302 may comprise several memory units or devices, but they will be perceived as being part of the same overall memory 302. There may be one memory unit for the robotic working tool controlling application storing instructions and application data, one memory unit for a display arrangement storing graphics data, one memory for the communications interface 303 for storing settings, and so on. As a skilled person would understand there are many possibilities of how to select where data should be stored and a general memory 302 for the user equipment 300 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 302.

In some embodiments the computing device 300 further comprises a communication interface 303. The communications interface 303 is configured to enable the user equipment 300 to communicate with robotic working tools, such as the robotic working tool of FIGS. 2A and 2B, and possibly with a server (440). In some embodiments where the computing device 300 acts as ain interconnecting device, the communication interface 303 of the computing device 300 is more advanced than the communication interface 215 of the robotic working tool 200.

The communication interface 303 may be wired and/or wireless. The communication interface 303 may comprise several interfaces.

In some embodiments the communication interface 303 comprises a radio frequency (RF) communications interface. In one such embodiment the communication interface 303 comprises a Bluetooth™ interface, a WiFi™ interface, a ZigBee™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface 303 comprises a cellular communications interface such as a fifth generation (5G) cellular communication interface, an LTE (Long Term Evolution) interface, a GSM (Global Systéme Mobilé) interface and/or other interface commonly used for cellular communication. In some embodiments the communication interface 303 is configured to communicate using the UPnP (Universal Plug n Play) protocol. In some embodiments the communication interface 303 is configured to communicate using the DLNA (Digital Living Network Appliance) protocol.

In some embodiments, the communication interface 303 is configured to enable communication through more than one of the example technologies given above. The communications interface 303 may be configured to enable the user equipment 300 to communicate with other devices, such as the server (440).

The user interface 310 comprises one or more output devices and one or more input devices. Examples of output devices are a display arrangement, such as a display screen 310-1, one or more lights and a speaker. Examples of input devices are one or more buttons 310-2 (virtual 310-2A or physical 310-2B) and a microphone. In some embodiments, the display arrangement comprises a touch display 310-1 that act both as an output and as an input device being able to both present graphic data and receive input through touch, for example through virtual buttons 310-2A.

Figure 4A:
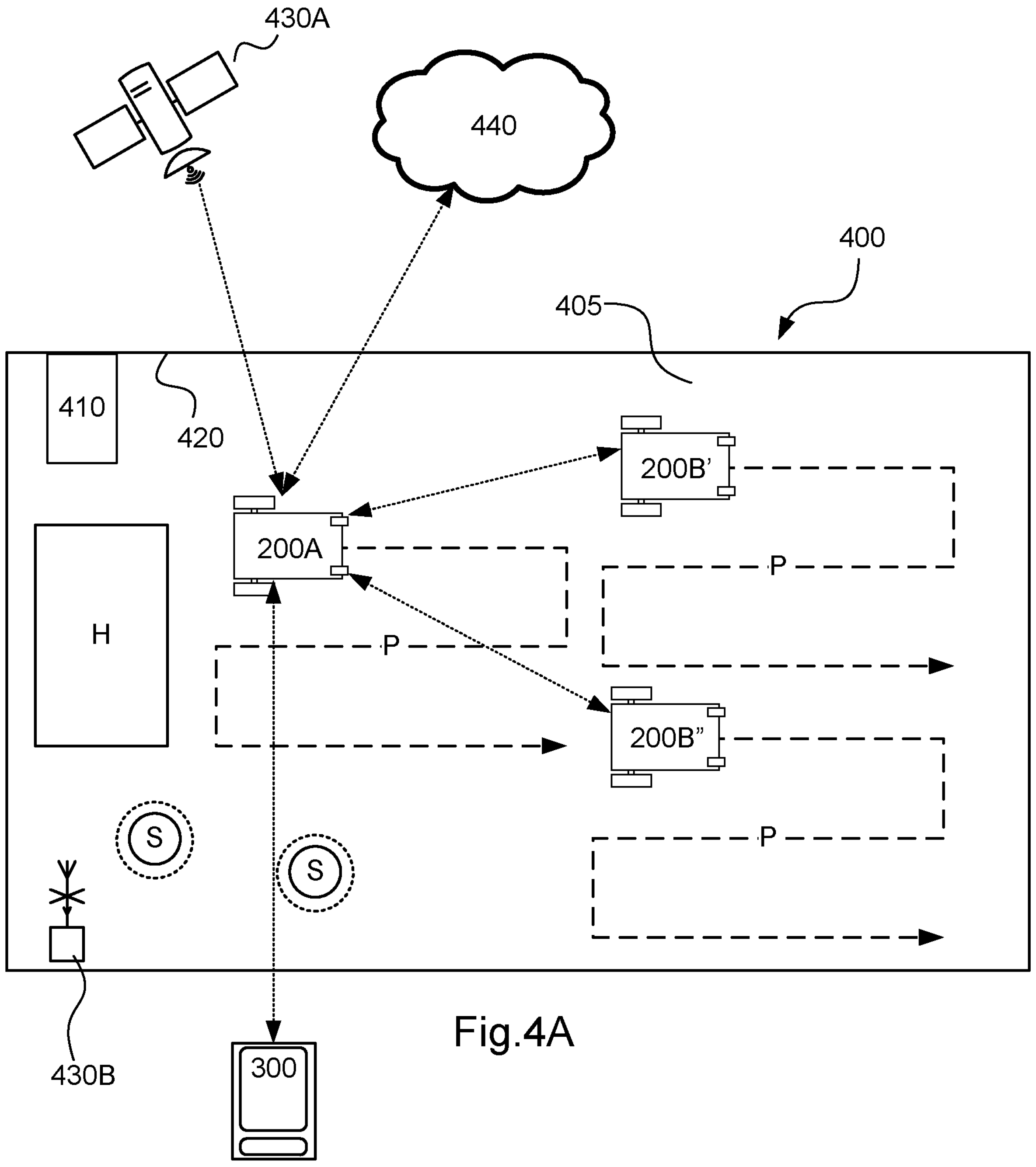
FIG. 4A shows a schematic view of a robotic working tool system (400) according to some example embodiments of the teachings herein.

FIG. 4A shows a robotic working tool system 400 in some embodiments. The schematic view is not to scale. The robotic working tool system 400 of FIG. 4A comprises a servicing station 410, such as a charging station 410, a first robotic working tool 200A and at least one second robotic working tool 200B (in this example two second robotic working tools 200B are shown, but there could be nay number of second robotic working tools 200B including 1, 2, 3, 4, 5 or greater). The robotic working tool system 400 of FIG. 4A, corresponds in many aspects to the robotic working tool system 100 of FIG. 1A, except that the robotic working tool system 400 of FIG. 4A comprises robotic working tools 200 according to the teachings herein. It should be noted that the work area 405 shown in FIG. 4A is simplified for illustrative purposes but may contain some or all of the features of the work area of FIG. 1A, and even other and/or further features as will be hinted at below.

As with FIGS. 2A and 2B, the robotic working tools are exemplified by robotic lawnmowers, whereby the robotic working tool system may be a robotic lawnmower system or a system comprising a combinations of robotic working tools, one being a robotic lawnmower, but the teachings herein may also be applied to other robotic working tools adapted to operate within a work area 405 bounded by a boundary 420.

In some embodiments the charging station 410 is arranged with a signal generator for providing a control signal through a boundary wire providing the boundary 420 of the work area 405. As mentioned above, the actual boundary wire is optional and the boundary 420 may be virtual, stored in a map application.

The robotic working tool system 400 may comprise or be arranged to utilize at least one signal navigation device 430. In the example of FIG. 4 two options are shown, a first being at least one satellite 430A (only one is shown, but it should be clear that a minimum of three are needed for an accurate three-dimensional location). The second option being at least one beacon, such as an RTK beacon 430B (only one shown).

The work area 405 is in this application exemplified as a garden, but can also be other work areas as would be understood. As hinted at above, the garden may contain a number of obstacles, for example a number of trees, stones, slopes and houses or other structures.

In some embodiments the robotic working tool is arranged or configured to traverse and operate in a work area that is not essentially flat, but contains terrain that is of varying altitude, such as undulating, comprising hills or slopes or such. The ground of such terrain is not flat and it is not straightforward how to determine an angle between a sensor mounted on the robotic working tool and the ground. The robotic working tool is also or alternatively arranged or configured to traverse and operate in a work area that contains obstacles that are not easily discerned from the ground. Examples of such are grass or moss-covered rocks, roots or other obstacles that are close to ground and of a similar colour or texture as the ground. The robotic working tool is also or alternatively arranged or configured to traverse and operate in a work area that contains obstacles that are overhanging, i.e. obstacles that may not be detectable from the ground up, such as low hanging branches of trees or bushes. Such a garden is thus not simply a flat lawn to be mowed or similar, but a work area of unpredictable structure and characteristics. The work area 405 exemplified with referenced to FIG. 4A, may thus be such a non-uniform work area as disclosed in this paragraph that the robotic working tool is arranged to traverse and/or operate in.

The robotic working tool system 400 also comprises or is arranged to be connected to a computing device 300, such as a user equipment 300 of FIG. 3. In some embodiments the robotic working tool 200 is arranged to be connected to the user equipment 300 directly and in some embodiments the robotic working tool 200 is arranged to be connected to the user equipment 300 indirectly through the charging station 410.

The robotic working tool system 400 comprises or is arranged to be connected to a server, such as a cloud server 440. The connection to the server 440 may be direct from the first robotic working tool 200A, direct from the user equipment 300, indirect from the first robotic working tool 200A via the charging station, and/or indirect from the first robotic working tool 200A via the user equipment 300. In some embodiments, the computing device 300 comprises the server 440.

In the below several embodiments of how the robotic working tool may be adapted will be disclosed. It should be noted that all embodiments may be combined in any combination providing a combined adaptation of the robotic working tool.

Figure 4B:
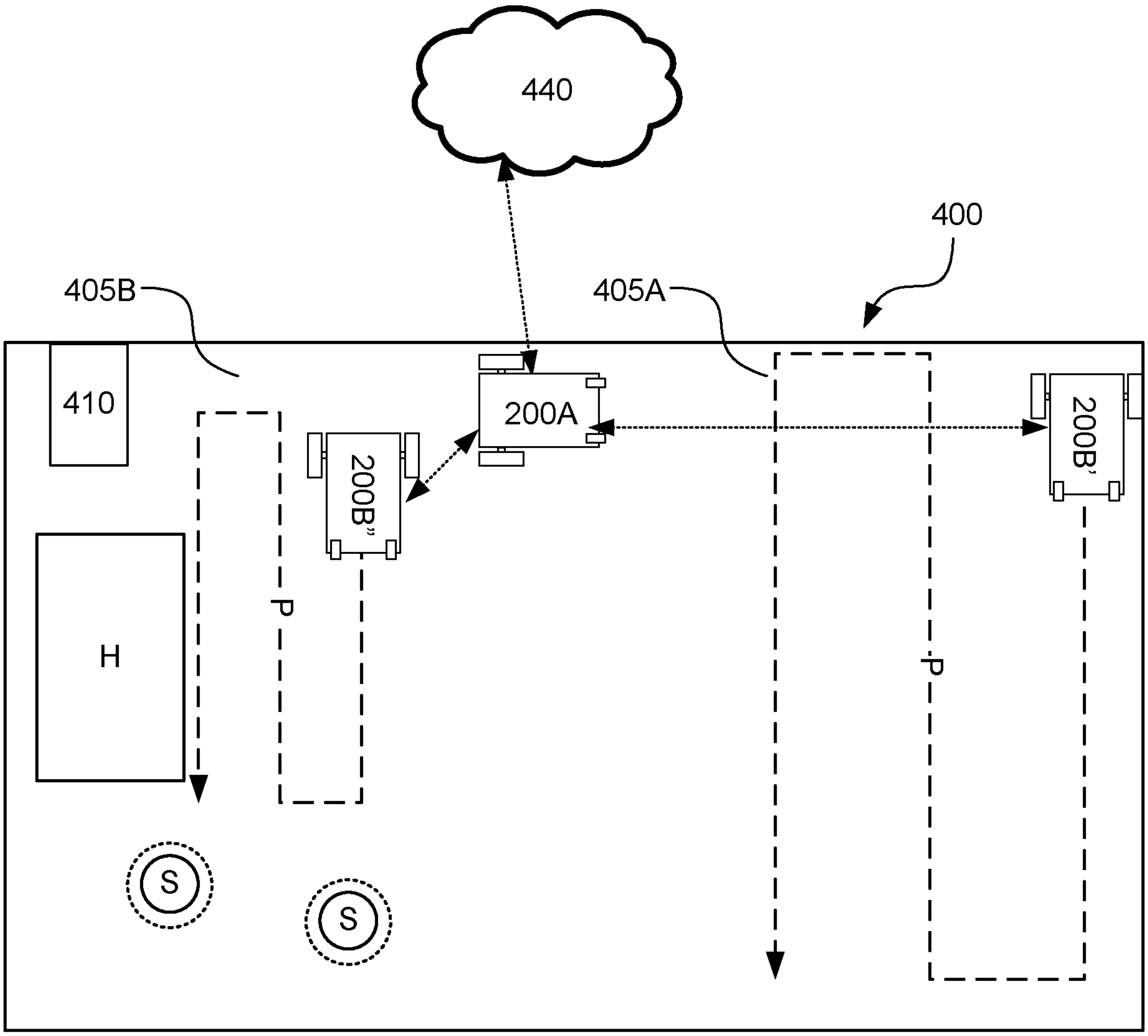
FIG. 4B shows a schematic view of a robotic working tool system (400) according to some example embodiments of the teachings herein.
Figure 4C:
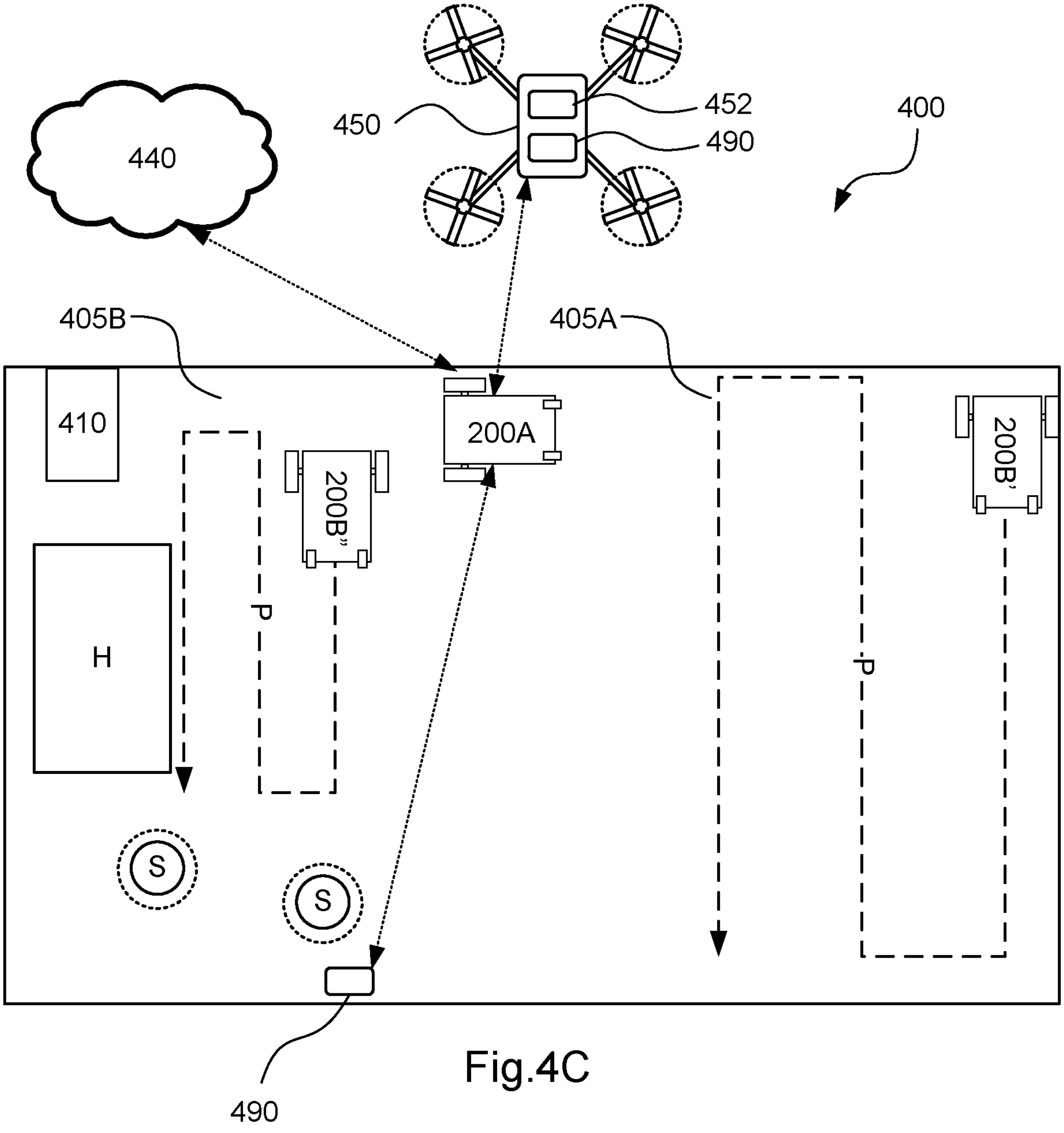
FIG. 4C shows a schematic view of a robotic working tool system (400) according to some example embodiments of the teachings herein.
Figure 4D:
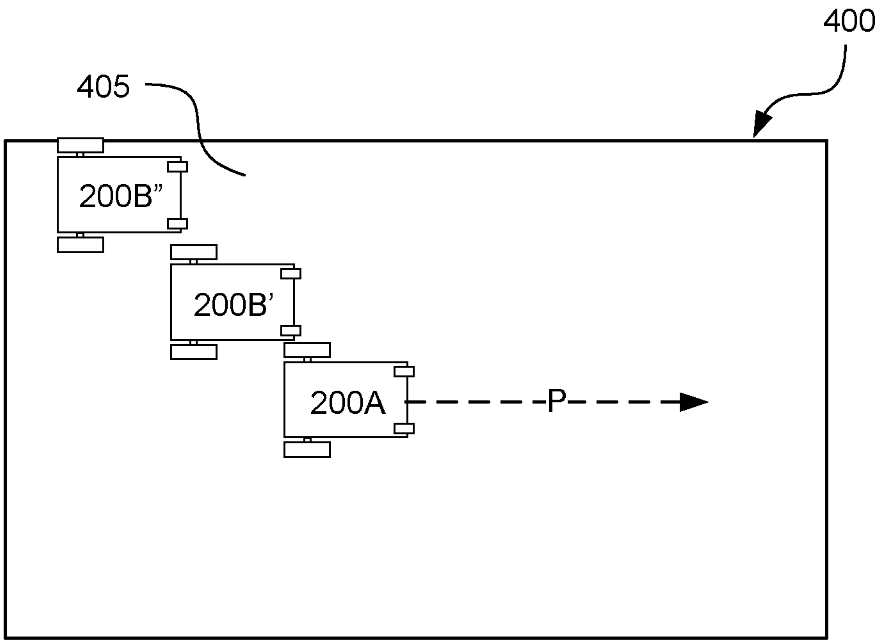
FIG. 4D shows a schematic simplified view of a robotic working tool system (400) according to some example embodiments of the teachings herein.
Figure 4E:
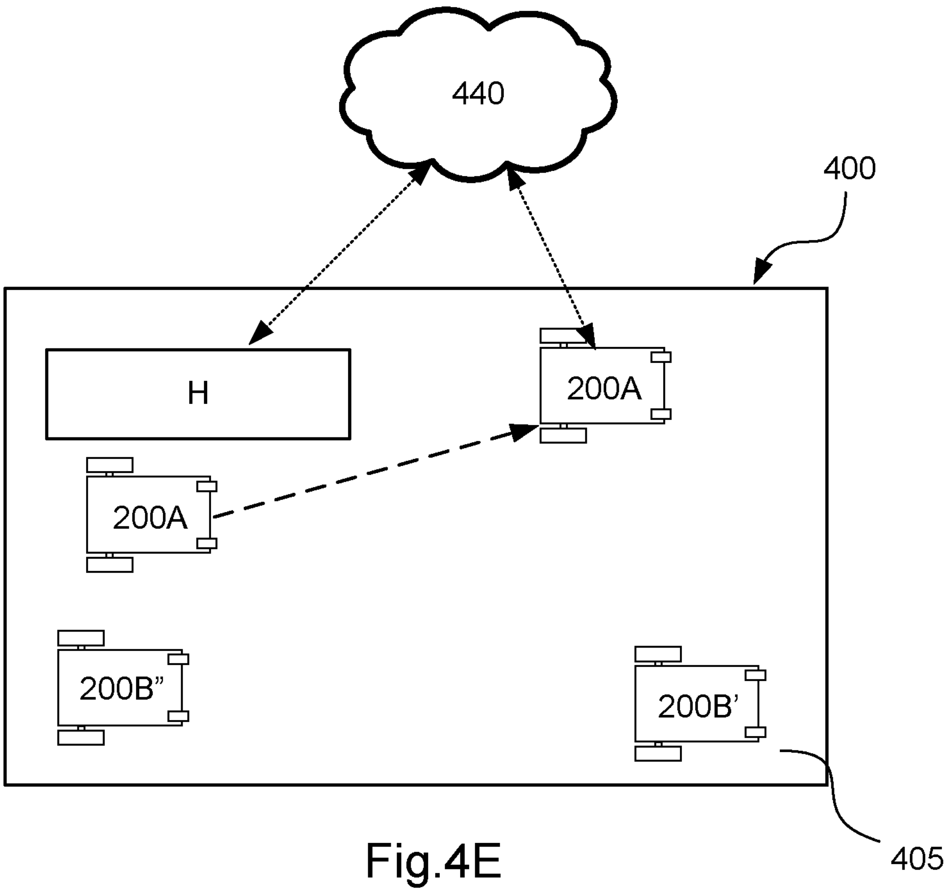
FIG. 4E shows a schematic simplified view of a robotic working tool system (400) according to some example embodiments of the teachings herein.
Figure 4F:
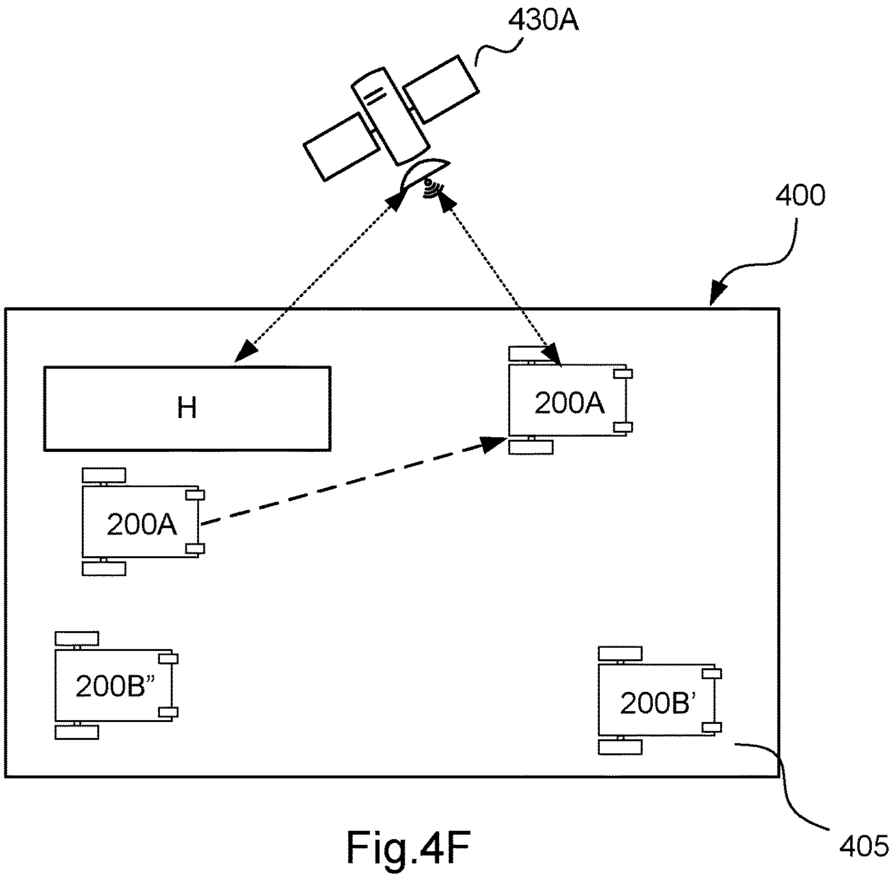
FIG. 4F shows a schematic simplified view of a robotic working tool system (400) according to some example embodiments of the teachings herein.
Figure 4G:
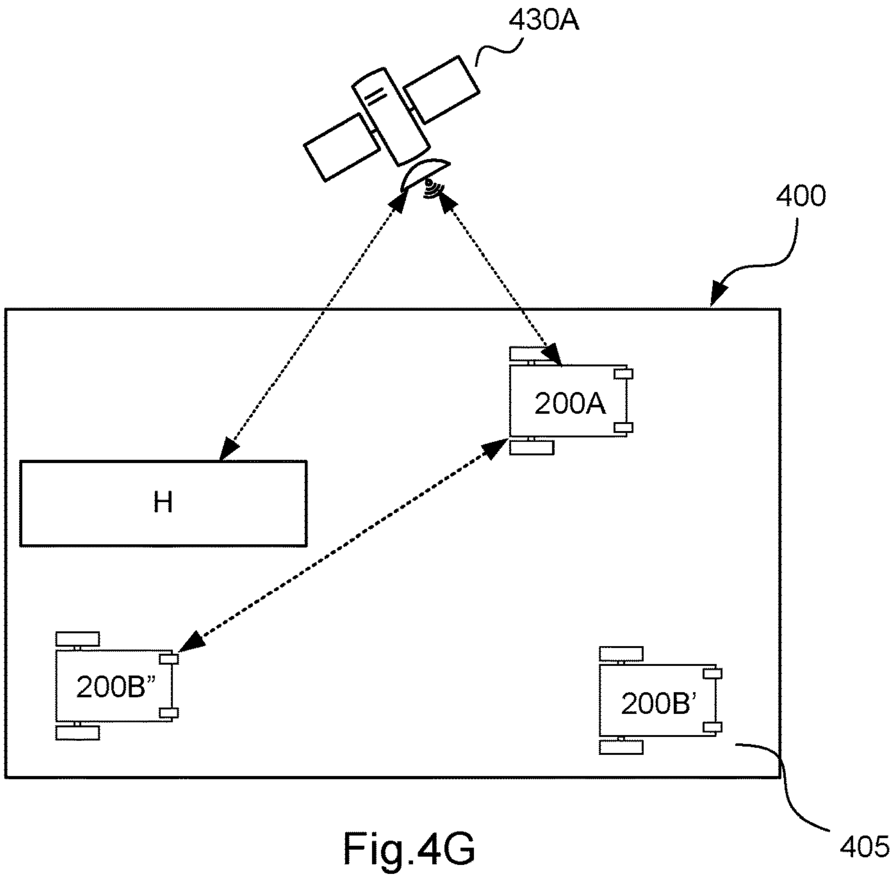
FIG. 4G shows a schematic simplified view of a robotic working tool system (400) according to some example embodiments of the teachings herein.
Figure 5A:
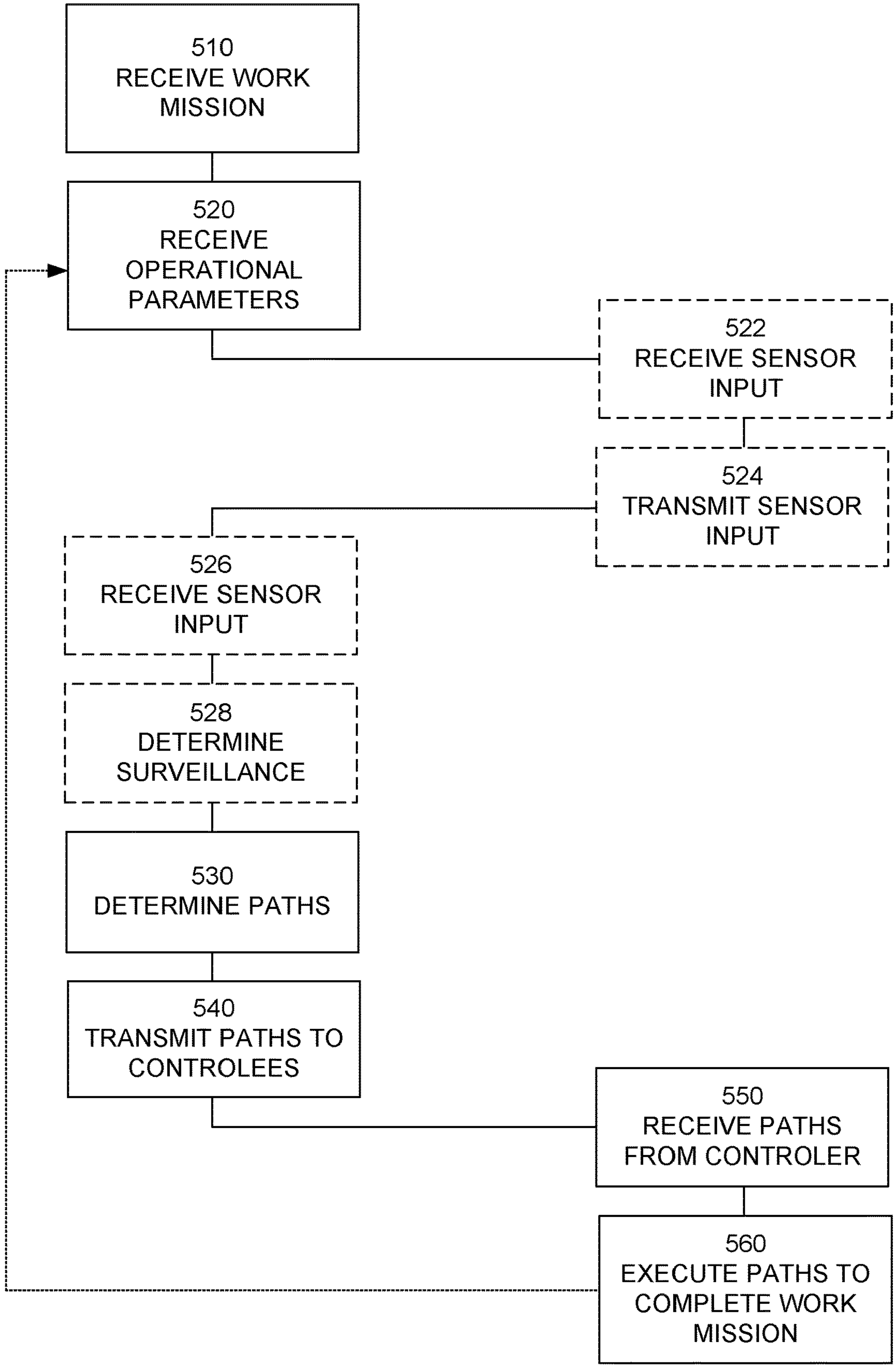
FIG. 5A shows a flowchart for a method for a robotic working tool system according to some example embodiments of the teachings herein.
Figure 5B:
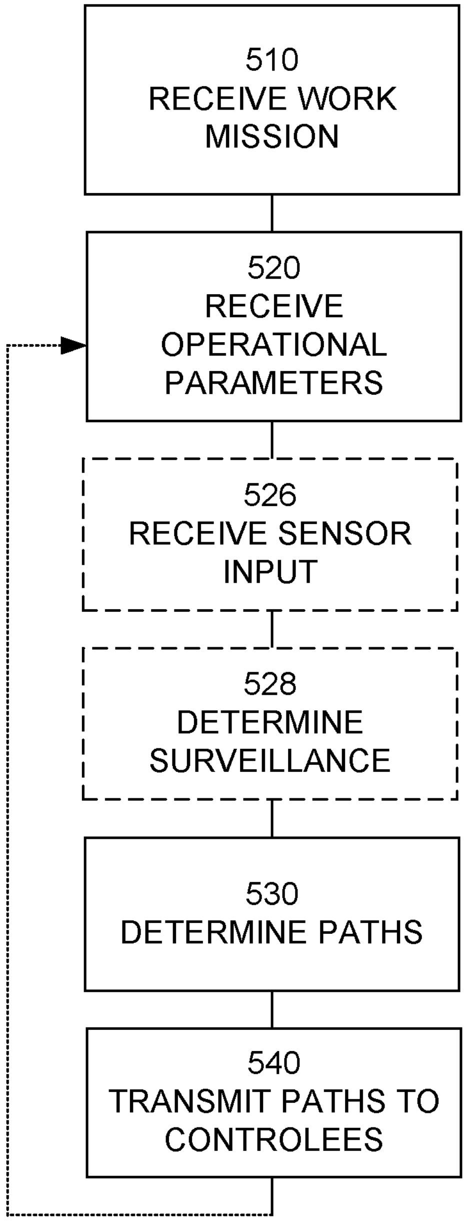
FIG. 5B shows a corresponding flowchart for a method for a first robotic working tool according to some example embodiments of the teachings herein.
Figure 5C:
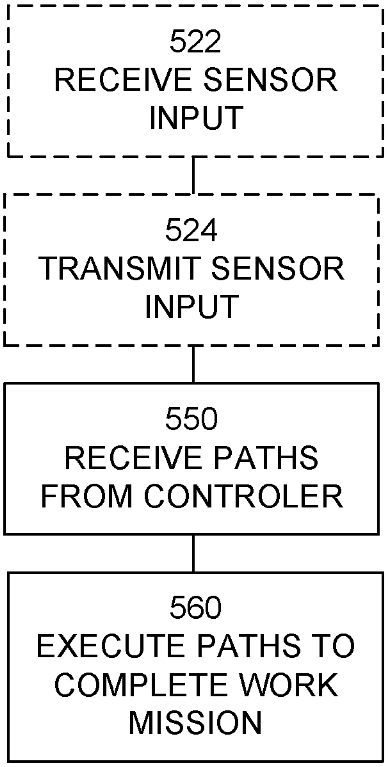
FIG. 5C shows a corresponding flowchart for a method for a second robotic working tool according to some example embodiments of the teachings herein.

FIG. 5A shows a flowchart for a method for a robotic working tool system according to some example embodiments of the teachings herein, FIG. 5B shows a corresponding flowchart for a method for a first robotic working tool according to some example embodiments of the teachings herein, and FIG. 5C shows a corresponding flowchart for a method for a second robotic working tool according to some example embodiments of the teachings herein. The methods are for use in a robotic working tool system as in any of FIGS. 4A to 4G and for use in a robotic working tool as in FIGS. 2A and 2B. The improved manner for providing cooperation herein will be discussed with simultaneous reference to FIG. 4A to 4G and FIGS. 5A to 5C. As is shown in FIG. 4A, the first robotic working tool 200A is connected to the server 440 and/or the user equipment 300. The first robotic working tool 200A is connected to each of the second robotic working tools 200B.

In some embodiments, only the first robotic working tool 200A is connected to the server 440 and/or the user equipment 300. This reduces the cost of the second robotic working tools 200B as they need not comprise a complicated communication interface 215 as it only requires a connection to the first robotic working tool 200A, and not the first robotic working tool 200A the server 440 and/or the user equipment 300. However, in such some embodiments the second robotic working tool 200B may also be connected to the server 440 and/or the user equipment 300, but then only to utilize the server 440 and/or the user equipment 300 as a communication path to the first robotic working tool 200A, along with possibly providing sensor data. The communication interface 215 of the second robotic working tools 200B may still be uncomplicated as it only requires a connection to the server 440 and/or the user equipment 300, and not the first robotic working tool 200A. In some such embodiments the first robotic working tool 200A is thus configured to connect to the at least one second robotic working tool 200B via the server 440, and the second robotic working tool 200B is configured to connect to the server 440 and to connect to the first robotic working tool 200A via the server 440.

FIG. 4A shows a robotic working tool system 400 wherein the first robotic working tool 200A is configured to receive 510 information regarding a work mission. The work mission is in some embodiments, the work to be performed by the robotic working tools in the work area. In some embodiments, the information for the work mission comprises parameters for the work mission. The parameters may include one, some or all of map details for work area, indicting which areas should be operated on and in what capacity, position for such work areas, details on obstacle in the work area, work parameters, such as constraints relating to for example noise, time of day allowed for operation, EXAMPLES, time for completion, (maximum) speed used during operation, and what tasks that are to be completed, such as grass cutting, grass trimming, edge trimming and so on to mention a few examples.

The first robotic working tool 200A also receives 520 operational parameters for the at least one second robotic working tool 200B. The operational parameters are in some embodiments received from at least some of the second robotic working tools 200B. The operational parameters are in some embodiments received from the server 440 storing information on the second robotic working tools 200B. In such embodiments the operational parameters may indicate settings to be used by the second robotic working tools 200B. The operational parameters are in some embodiments received from the second robotic working tools 200B. The operational parameters are in some embodiments received in a combination of some or all of the options given above.

The first robotic working tool 200A thereafter determines 530 path planning for each of the at least one second robotic working tool 200B based on the operational parameters for the at least one second robotic working tool 200B and the information regarding the work mission so that the path planning completes the work mission. The paths are determined and planned so that the work load is divided among the second robotic working tools 200B in a manner so that each or rather most of the second robotic working tools 200B finish at approximately the same time. The paths are thus planned so that all partial areas of the work area are covered (possibly as indicated in the work mission) and under the constraints/parameters given in the work mission.

To illustrate with an example, assume that the two second robotic working tools 200B are both lawnmowers, and the work mission indicates that the work area is to be serviced, by cutting the grass in the work area. The work mission may include the size of the work area, or this may already be known by the first robotic working tool 200A. The operational parameters that the first robotic working tool 200A receives regarding the second robotic working tools 200B may include, power capacity, speed of propulsion, power consumption (possibly at different speeds of propulsion), width of robotic working tool and cutting disc diameter. The first robotic working tool 200A is then enabled to plan which partial area of the work area is to be serviced by which second robotic working tool 200B so that the work is concluded at roughly the same time, by setting a speed of propulsion for each of the robotic working tools and assign a length of operating accordingly so that the second robotic working tools finish at the same time. For example, if the total area to be cut is 20 m×20 m=400 m2, the operational parameters for a first second robotic working tool 200B' are speed of propulsion 2 m/s and cutting diameter 0.5 m and the operational parameters for a second second robotic working tool 200B" are speed of propulsion 2 m/s and cutting diameter 0.25 m, the first robotic working tool 100A may conclude that it requires approx. 267 seconds to service the work area 405, and that in this time the first second robotic working tool 200B' will be able to service (rounded) 13 (horizontal) meters of the work area 405 and the second second robotic working tool 200B" will be able to service (rounded) 7 (horizontal) meters of the work area 405, and as the second second robotic working tool 200B" is smaller than the first second robotic working tool 200B', the second second robotic working tool 200B" is planned to operate in the left-hand partial work area 405B (having most obstacles that the second second robotic working tool 200B" will be able to navigate around more easily) and the first second robotic working tool 200B' is planned to operate in the right-hand partial work area 405A.

The first robotic working tool then transmits 540 the path planning the second robotic working tools 200B. As the second robotic working tools 200B receive 550 the path planning data from the first robotic working tool 200A, the second robotic working tools 200B execute 560 the work mission according to the path planning data. FIG. 4B shows the planned paths of this example. In some embodiments the path planning data comprises navigational parameters, such as one, some or all of area to cover (possibly given as coordinates), path to follow, pattern to execute (structured, random or semi random), starting point (possibly given as coordinates), end point (possibly given as coordinates), speed, where to activate work tool, where to deactivate work tool and/or time spent in area or on path to mention a few examples. It should be noted that in the teachings herein a planned path does not only comprise navigational information regarding the actual path, but also timing information for when to execute the path, such as start times, end times, durations to mention a few examples.

This enables the first robotic working tool 200A to act as a controller for the second robotic working tools 200B, thereby acting as controlees. This enables for a path planning to be determined and executed locally without requiring a good and stable communication with a server 440. It should be noted that in some embodiments the robotic working tool is configured to store the work missions in the memory whereby a connection with the server is not required, or only intermittently required for receiving new work missions. In some such embodiments, the server is thus not required.

As discussed in the above, an efficient path planning also takes into account environmental factors. In order to facilitate such path planning, and without requiring stable and continuous server connections the second robotic working tools 200B comprises sensors in some embodiments. In some such embodiments, the sensors include signal navigation sensors 280 (such as GPS) for sensing a position. In some such alternative or additional embodiments, the sensors include deduced reckoning sensors 285 (such as odometers and/or IMUs) for sensing navigational data. In some such alternative or additional embodiments, the sensors include other sensors 290. In some such embodiments, the other sensors are imaging devices. In some such alternative or additional embodiments, the sensors are internal sensors. As would be understood, the second robotic working tools 200B may thus comprise a (second) number of sensors.

In such embodiments, the second robotic working tool 200B is configured to receive 522 sensor input from the sensors 280, 285, 290 and to transmit 524 the sensor input to the first robotic working tool 200A. The first robotic working tool 200A is further configured to receive 526 the sensor input from the at least one second robotic working tool 200B and determine 530 the path planning for each of the at least one second robotic working tool 200B further based on the sensor input.

In some embodiments the first robotic working tool 200B comprises a (first) number of sensors 290. In some such embodiments, the sensors include moisture sensors, rain sensors and other external sensors 290. In some such alternative or additional embodiments, the sensors 290 include imaging devices.

In such embodiments, the first robotic working tool 200A is configured to receive sensor input 226 from the sensors 290 and determine the path planning for second robotic working tools 200B further based on the sensor input. In some embodiments the sensor input received from the sensors 290 of the first robotic working tool 200A is received in addition to the sensor input received from the second robotic working tools 200B. In some embodiments the sensor input received from the sensors 290 of the first robotic working tool 200A is received as an alternative to the sensor input received from the second robotic working tools 200B.

In some embodiments the first robotic working tool 200A is arranged with more sensors (the first number of sensors is greater than the second number of sensors) and/or sensors of a more complicated nature. This enables for the first robotic working tool 200A to receive advanced sensor input while keeping the cost of the second robotic working tools 200B low.

In some embodiments the sensor input includes one or more taken from the group comprising positional information for a robotic working tool, environmental information (such as wet areas or rain), slippery areas, windy areas, blocked areas, or inhabited areas to not disturb.

In some embodiments, the first or controlling robotic working tool is selected as the robotic working tool having the best signal reception or a, some or all sensors. This allows the robotic working tool with the best quality of sensor inputs to be the controlling robotic working tool. In such embodiments, at least one of the first number of sensors is thus receiving sensor input at a higher quality than a corresponding sensor in the second number of sensors.

As noted above, the sensors 290 of the first robotic working tool 200A may include imaging device(s). The imaging device(s) is arranged to provide one or more images of at least part of the work area 405. In some such embodiments, the first robotic working tool 200A is configured to determine 228 a surveillance of the work area 405 based on the one or more images (being sensor input) and to determine the path planning for each of the for the at least one second robotic working tool 200B further based on the surveillance of the work area 405.

The surveillance includes, in some embodiments, the locations of the second robotic working tools 200B, inhabitants of the work area (pets, persons, vehicles and so on) and/or environmental factors (such as rain) to mention a few examples.

In some embodiments one or more sensors 290 are mounted remotely to the robotic working tool 200A. In such embodiments the sensor comprises a communication interface to transmit the sensor input to the first robotic working tool 200A through.

In some such embodiments, the remote sensor may transmit the sensor input indirectly to the first robotic working tool 200A via one or several of the second robotic working tools 200B, the second robotic working tools 200B then acting as relays.

In some such embodiments, the remote sensor may store the sensor input and transmit the sensor input to the first robotic working tool 200A as the first robotic working tool 200A comes into range. In such embodiments, the first robotic working tool 200A can roam the work area in order to retrieve sensor readings from remote sensors.

Such embodiments enables for a cheaper and less complicated communication interface in the remote sensor as it reduces the requirement of long range capabilities.

Remote sensors enables for obtaining reliable readings at remote locations in the work area (or for the work area) without the robotic working tool having to be in such locations, or where the robotic working tool is unable to be in such locations.

In some embodiments the first robotic working tool 200A is thus configured to connect to the remote sensor to receive sensor input.

Some examples of remote sensors are moisture sensors, soil condition sensors, movement detectors, and imaging devices (such as cameras).

In some embodiments the remote sensor thus comprises the imaging device discussed in the above, which enables for obtaining images of the work area from different angles, and for angles from locations that the robotic working tool would possibly not be able to go to.

In some embodiments the remote sensor is arranged in a drone. A drone is defined for the purpose herein to be a flying vehicle that is operated autonomously, remote-controlled by the first robotic working tool or a combination of autonomous execution of remote-controlled commands. This enables both for the remote sensor to be moved from places to places, without the first robotic working tool having to travel to such places. This also enables for obtaining for example images from above, giving overview images of the work area.

In some embodiments the robotic working tool system 400 thus further comprises a drone 450 comprising a communication interface 452 for connecting to the first robotic working tool 200A and a sensor 490 acting as the remote sensor 490.

FIG. 4C shows a schematic view of a robotic working tool system 400 as in FIGS. 4A and 4B, where a remote sensor 490 is arranged in the work area 405 and where a drone 450 is shown as comprising a remote sensor 490.

As drones are known in other fields, a skilled person would be able to find details on how exactly to implement a drone, wherefore no further details will be given herein apart from giving such reference to the state of the art in the field of flying drones.

As discussed in the above, a robotic working tool may be of many different types. Such robotic working tools of different types may be useful in a work area where several tasks are to be performed. One example is a garden where watering as well as cutting grass may be desired. Another example is a golf course, where apart from cutting and watering, golfball collecting may also be desired. A further example is an airfield where additionally edge trimming is desired. Yet a further example is a park where additionally leaf blowing and possibly collecting is desired.

There are thus many instances where multiple services are desired. However, and as is touched upon in the background section, different robotic working tools may operate in different manners and thus obstruct one another if simply set to operate at the same time in the same area. On the other hand, if only ne robotic working tool is to operate at any given time, the desired services, i.e. the work mission, may not be possible to complete in a reasonable time, such as when the work area is relatively free of inhabitants, or before the result of the first task (the service executed first) is already made void by time, before the last task finishes.

However, by enabling a controller (first) robotic working tool to determine a suitable plan for multiple controllee (second) robotic working tools, some being of different types, and to do so locally where the work area can be surveillanced and monitored—and without requiring a stable and/or continuous connection to a server 440, enables for a dynamic means for scheduling the robotic working tools operation so that a work mission is successfully completed in a minimum of time.

In some embodiments the robotic working tool system 400 thus comprises a first second robotic working tool 200B' that comprises a first work tool and a second second robotic working tool 200B" that comprises a second work tool, wherein the first and the second work tools are of different types. One example being the first work tool being a grass cutter and the second work tool being a watering device.

As indicated above, the controller or first robotic working tool 200A is enabled to determine the path planning dynamically, such as after receiving new sensor input or upon a second robotic working tool having experienced problems such as encountering an (new) obstacle or mechanical failure.

The first robotic working tool 200A is thus configured to receive updated information, from a second robotic working tool 200B and/or from a sensor 290, and in response thereto determine (updated) path planning and transmit to the second robotic working tools 200B, or at least to the second robotic working tools 200B that are affected by the updated path planning, such as those for which updated paths have been determined. This is indicated in FIG. 5A by the dotted arrow.

As discussed, the main purpose of the first robotic working tool 200A is to be a controller robotic working tool 200A controlling at least one controlee (second) robotic working tool 200B. The first robotic working tool 200A is therefore, in some embodiments, arranged without a work tool. This allows the first work tool 200A to traverse the work area in order to gather information or to simply obtain a good overview, without wasting energy on a work tool. It also enables for moving around without leaving significant tracks or marks.

Travelling with the work tool deactivated would accomplish most of these benefits, but at a higher cost and weight, thus increasing the overall cost of the system (as well as the power consumption due to the extra weight).

In some embodiments the first robotic working tool 200A is thus arranged without a work tool.

However, in some embodiments, the first robotic working tool is configured to also be part of the work mission and the path planning is thus adapted accordingly based on the operational parameters of the first robotic working tool 200A.

In some embodiments the first robotic working tool 200A is thus further configured to: determine path planning also for the first robotic working tool 200A, and execute the work mission by causing the first robotic working tool 200A to follow the planned path.

In some such embodiments, the first robotic working tool 200A is configured to operate in conjunction with at least some of the second robotic working tools 200B operating as the leader. In such embodiments, the second robotic working tools can thus be made relatively uncomplicated as all they have to do is basically follow the first robotic working tool. In such embodiments, the path planning provided to a second robotic working tool is simply instructions on how to follow the first robotic working tool 200A. In some embodiments the second robotic working tool 200B is thus configured to execute the work mission by causing the second robotic working tool 200B to follow the first robotic working tool 200A in a pattern, where the path planning for each second robotic working tool indicates the pattern.

FIG. 4D shows a simplified view of an example of a robotic working tool system 400, as in FIGS. 4A to 4C, where the second robotic working tools 200B are set up to follow the first robotic working tool 200A by following behind on the side of the first robotic working tool 200A. In some embodiments, the first robotic working tool 200A is configured to determine how the second robotic working tool(s) 200B is to follow based on the operational parameters of not only the second robotic working tool 200B, but also the first robotic working tool 200A.

As an example, if the first and second robotic working tools area robotic lawnmowers that eject the cut grass on the left side, having the second robotic working tools follow behind and to the left will ensure that the ejected grass is cut again (or mulched) and ejected again further out to the left side. This will enable for keeping the work area relatively clean of the debris resulting from the operation, i.e ejecting the grass, which is now finely mulched, out over the side of the work area, possibly into a hedge where it is not seen.

The pattern in which a second robotic working tool follows a first robotic working tool may thus be to follow behind, on the side, behind on the side, in front or in front on the side.

It should be noted that in some embodiments the first robotic working tool is configured to determine the path planning so that one of the second robotic working tools 200B is selected to be the leader that other second robotic working tools (one, some or all) are to follow in any of the manners discussed herein.

Of course, in some embodiments, the path planning may be determined so that the second robotic working tools effectively follow the first robotic working tool simply by following their own path(s), where the paths are planned to be executed conjointly.

As discussed, a work area may contain many different structures or other obstacles. The work area may also be surrounded by many different structures or other obstacles. Furthermore, the work area may also be affected by many different environmental factors, such as interference. These are all examples of reception factors that may cause the connection to the server 440 to be of a quality level that does not enable for a reliable connection.

One example is showing in FIG. 4E, showing a simplified view of an example of a robotic working tool system 400 as in FIGS. 4A to 4D, where the connection to the server 440 is blocked by a house H, as an example of a factor interfering with the connection. To overcome such connection problems, the first robotic working tool 200A is, in some embodiments, configured to move to a position that is indicative of a good reception. IN FIG. 4E this is illustrated by the dashed arrows from the first position of the first robotic working tool 200A to the second position of the first robotic working tool 200A. As is illustrated in FIG. 4E, the connection at the first position is not possible, but the connection is possible at the second position.

In some embodiments the first robotic working tool 200A is configured to move to a position indicative of a good reception by retrieving a stored position. In some embodiments, the position is a position that previously has had good reception and moving to the position. In such embodiments the first robotic working tool is thus configured to store such a position. In some such embodiments, the position indicative of a good reception is the position where the work mission was received. In some alternative or additional such embodiments, the position indicative of a good reception is the position of the service station. In some alternative or additional such embodiments, the position indicative of a good reception is a position where the signal reception was last above a (first) signal threshold level.

In some alternative or additional embodiments, the position indicative of a good reception is based on the map application. In some such embodiments the position is a position in the map application indicating a good reception. In some embodiments the position based on the map is determined as a position where the first robotic working tool is least blocked or otherwise subjected to or affected by factors as discussed above. In some such embodiments, the location of a known wifi router, base station or other connection device used to connect to the server is also stored in the map, enabling for determining a position where the robotic working tool is least blocked with regards to the connection device.

In some alternative or additional embodiments, the position indicative of a good reception is a position in the map application indicating a good reception.

In some embodiments the first robotic working tool 200A is configured to move to a position indicative of a good reception by traversing or moving around in the work area until a connection is received of a signal quality above a (second) threshold level.

In some embodiments, the second threshold level indicates a minimum required reception quality. In some embodiments, the first threshold level indicates a good reception quality. In some embodiments the first level is higher than the second level.

In some embodiments the first robotic working tool 200A is thus configured to determine that the connection to the server is of a quality falling below a threshold level and in response thereto cause the first robotic working tool 200A to move to a position indicative of a good connection to the server.

For the teachings herein it is considered that a connection or reception quality falls below a threshold level as the signal quality of the connection falls below a level, there are a number of signal interruptions that exceeds a threshold level, possibly the number of interruptions is determined in a time period, the signal strength level falls below a level, or a correlation confidence falls below a level to mention a few examples.

A similar situation may occur where the first robotic working tool loses or otherwise experiences a bad reception with a satellite (or other signal navigation source, such as a beacon). One example is showing in FIG. 4F, showing a simplified view of an example of a robotic working tool system 400 as in FIGS. 4A to 4E, where the connection of the first robotic working tool 200A to the satellite 430 is blocked by a house H, as an example of a factor interfering with the connection.

As discussed in relation to FIG. 4E, the robotic working tool may overcome this by determining that the reception of satellite signals is of a quality falling below a threshold level and in response thereto cause the first robotic working tool 200A to move to a position indicative of a good reception of satellite signals. Such a position may be determined in a manner similar to the determination of the position indicative of a good connection to the server 440 discussed above. Similarly, a second robotic working tool 200B may also experience reception problems with regards to a satellite, and thus experiencing problems in successfully determine its position accurately.

One example is showing in FIG. 4G, showing a simplified view of an example of a robotic working tool system 400 as in FIGS. 4A to 4F, where the connection of the second robotic working tool 200B" to the satellite 430 is blocked by a house H, as an example of a factor interfering with the connection. In order to overcome such problems, the first robotic working tool 200A is configured to act as a beacon for the second robotic working tool 200B. In such embodiments, the first robotic working tool 200A is thus configured to determine the position of the first robotic working tool 200A and transmit the determined position to at least one of the at least one second robotic working tool 200B, thereby acting as a navigational beacon for the at least one of the at least one second robotic working tool 200B.

The invention claimed is:

1. A robotic working tool system comprising a first robotic working tool, a drone and at least one second robotic working tool, the second robotic working tool comprising a communication interface and a controller, wherein the communication interface is configured to connect the second robotic working tool to the first robotic working tool, the first robotic working tool comprising a communication interface and a controller, wherein the communication interface is configured to connect the first robotic working tool to a server and to the at least one second robotic working tool, wherein the drone comprises an imaging device configured to provide one or more images along a planned path of the at least one second robotic working tool through a work area, and wherein the controller of the first robotic working tool is configured to:

receive information regarding a work mission, the information comprising parameters for the work mission;

receive operational parameters for the at least one second robotic working tool;

receive sensor input from the imaging device;

determine path planning for each of the at least one second robotic working tool based on a combination of the operational parameters for the at least one second robotic working tool, the sensor input received from the imaging device, and the information regarding the work mission so that the path planning completes the work mission, and to transmit the path planning for the at least one second robotic working tool to the at least one second robotic working tool, and wherein the controller of the second robotic working tool is configured to:

receive path planning data from the first robotic working tool and to execute the work mission according to the path planning data.

2. The robotic working tool system according to claim 1, wherein the at least one second robotic working tool comprises a second number of sensors, and wherein the controller of the second robotic working tool is further configured to receive sensor input from the second number of sensors and transmit the sensor input to the first robotic working tool, and wherein the controller of the first robotic working tool is further configured to receive the sensor input from the at least one second robotic working tool and determine the path planning for each of the for the at least one second robotic working tool further based on the sensor input.

3. The robotic working tool system according to claim 2, wherein the first number of sensors includes an imaging device, providing one or more images of at least part of the work area, and wherein the controller of the first robotic working tool is further configured to determine a surveillance of the work area based on the one or more images and to determine the path planning for each of the for the at least one second robotic working tool further based on the surveillance of the work area.

4. The robotic working tool system according to claim 2, wherein the first number of sensors includes a remote sensor, and wherein the controller of the first robotic working tool is further configured to connect to the remote sensor to receive sensor input.

5. The robotic working tool system according to claim 1, wherein the first robotic working tool comprises a first number of sensors, and wherein the controller of the first robotic working tool is further configured to receive sensor input from the first number of sensors and determine the path planning for each of the for the at least one second robotic working tool further based on the sensor input.

6. The robotic working tool system according to claim 5, wherein at least one of the first number of sensors is receiving sensor input at a higher quality than a corresponding sensor in the second number of sensors.

7. The robotic working tool system according to claim 1, wherein a first of the at least one second robotic working tool comprises a first work tool and a second of the at least one second robotic working tool comprises a second work tool, wherein the first and the second work tools are of different types.

8. The robotic working tool system according to claim 7, wherein the controller of the first robotic working tool is further configured to determine the position and transmit the determined position to at least one of the at least one second robotic working tool, thereby acting as a navigational beacon for the at least one of the at least one second robotic working tool.

9. The robotic working tool system according to claim 1, wherein the first robotic working tool is arranged without a work tool.

10. The robotic working tool system according to claim 1, wherein the controller of the first robotic working tool is further configured to connect to the at least one second robotic working tool via the server, and wherein the controller of the second robotic working tool is further configured to connect to the server and to connect to the first robotic working tool via the server, wherein the controller of the first robotic working tool is further configured to determine that the connection to the server is of a quality falling below a threshold level and in response thereto cause the first robotic working tool to move to a position indicative of a good connection to the server.

11. The robotic working tool system according to claim 1, wherein the first robotic working tool comprises a satellite navigation device configured to receive satellite signals for determining a position, and wherein the controller of the first robotic working tool is further configured to determine that the reception of satellite signals is of a quality falling below a threshold level and in response thereto cause the first robotic working tool to move to a position indicative of a good reception of satellite signals.

12. The robotic working tool system according to claim 1, wherein the robotic working tool is configured for operating in a work area comprising an uneven surface, where objects are of a similar appearance to the surface and/or overhanging obstacles.

13. The robotic working tool system according to claim 1, wherein at least one of the at least one second robotic working tool is a robotic lawnmower.

14. A method for use in a robotic working tool system comprising a first robotic working tool, a drone and at least one second robotic working tool, the second robotic working tool comprising a communication interface and a controller, wherein the communication interface is configured to connect the second robotic working tool to the first robotic working tool, the first robotic working tool comprising a communication interface, wherein the communication interface is configured to connect the first robotic working tool to a server and to the at least one second robotic working tool, wherein the drone comprises an imaging device configured to provide one or more images along a planned path of the at least one second robotic working tool through a work area, and wherein the method comprises the first robotic working tool:

receiving information regarding a work mission, the information comprising parameters for the work mission;

receiving operational parameters for the at least one second robotic working tool;

receiving sensor input from the imaging device;

determining path planning for each of the for the at least one second robotic working tool based on the operational parameters for the at least one second robotic working tool, the sensor input received from the imaging device and the information regarding the work mission so that the path planning completes the work mission, and transmitting the path planning for the at least one second robotic working tool to the at least one second robotic working tool, and wherein method further comprises the second robotic working tool:

receiving path planning data from the first robotic working tool and executing the work mission according to the path planning data.

15. A robotic working tool comprising a communication interface and a controller, wherein the communication interface is configured to connect the robotic working tool to a server and to at least one second robotic working tool, and wherein the controller is configured to:

receive information regarding a work mission, the information comprising parameters for the work mission;

receive operational parameters for the at least one second robotic working tool;

receive sensor input from an imaging device in a drone, wherein the imaging device is configured to provide one or more images along a planned path of the at least one second robotic working tool through a work area;

determine path planning for each of the for the at least one second robotic working tool based on the operational parameters for the at least one second robotic working tool, the sensor input received from the imaging device, and the information regarding the work mission so that the path planning completes the work mission;

and to transmit the path planning for the at least one second robotic working tool to the at least one second robotic working tool.

16. A robotic working tool according to claim 15, wherein the communication interface is configured to connect the robotic working tool to first robotic working tool, and wherein the controller is configured to:

receive path planning data regarding a work mission from the first robotic working tool and to execute the work mission according to the path planning data.

17. A method for use in a robotic working tool comprising a communication interface, wherein the communication interface is configured to connect the robotic working tool of claim 15 to first robotic working tool, and wherein the method comprises:

receiving path planning data regarding a work mission from the first robotic working tool and executing the work mission according to the path planning data.

18. A method for use in a robotic working tool comprising a communication interface, wherein the communication interface is configured to connect the robotic working tool to a server and to at least one second robotic working tool, and wherein the method comprises:

receiving information regarding a work mission, the information comprising parameters for the work mission;

receiving operational parameters for the at least one second robotic working tool;

receiving sensor input from an imaging device in a drone, wherein the imaging device is configured to provide one or more images along a planned path of the at least one second robotic working tool through a work area;

determining path planning for each of the for the at least one second robotic working tool based on the operational parameters for the at least one second robotic working tool and the information regarding the work mission so that the path planning completes the work mission;

and transmitting the path planning for the at least one second robotic working tool to the at least one second robotic working tool.

* * * * *